United States Patent [19]

Schorter

[11] 4,086,565
[45] Apr. 25, 1978

[54] AUTOMOTIVE ELECTRONIC FLASHER UNIT

[75] Inventor: Bruno Schorter, Morsang, France

[73] Assignee: U.S. Philips Corporation, New York, N.Y.

[21] Appl. No.: 720,808

[22] Filed: Sep. 7, 1976

[30] Foreign Application Priority Data

Sep. 16, 1975 France .................................. 75 28355

[51] Int. Cl.² .............................................. B60Q 1/38
[52] U.S. Cl. .................... 340/81 R; 315/77; 340/251
[58] Field of Search ...................... 315/77, 76, 200 A; 340/81 R, 81 F, 80, 251

[56] References Cited

U.S. PATENT DOCUMENTS

| 3,824,542 | 7/1974 | Schorter | 340/81 R |
| 3,858,177 | 12/1974 | Kugelmann et al. | 340/81 R X |
| 3,955,174 | 5/1976 | Ives et al. | 340/81 R X |

*Primary Examiner*—Alfred E. Smith
*Assistant Examiner*—Charles F. Roberts
*Attorney, Agent, or Firm*—Frank R. Trifari; Bernard Franzblau

[57] ABSTRACT

Flasher unit which comprises an electromagnetic relay which is controlled by an astable multivibrator.

The voltage drop across a resistor of low value controls a circuit for inhibiting the operation of the astable multivibrator in the event of excess currents (short-circuit) or causes a frequency variation of the multivibrator in the event of too small a current (burnt-out lamp).

11 Claims, 1 Drawing Figure

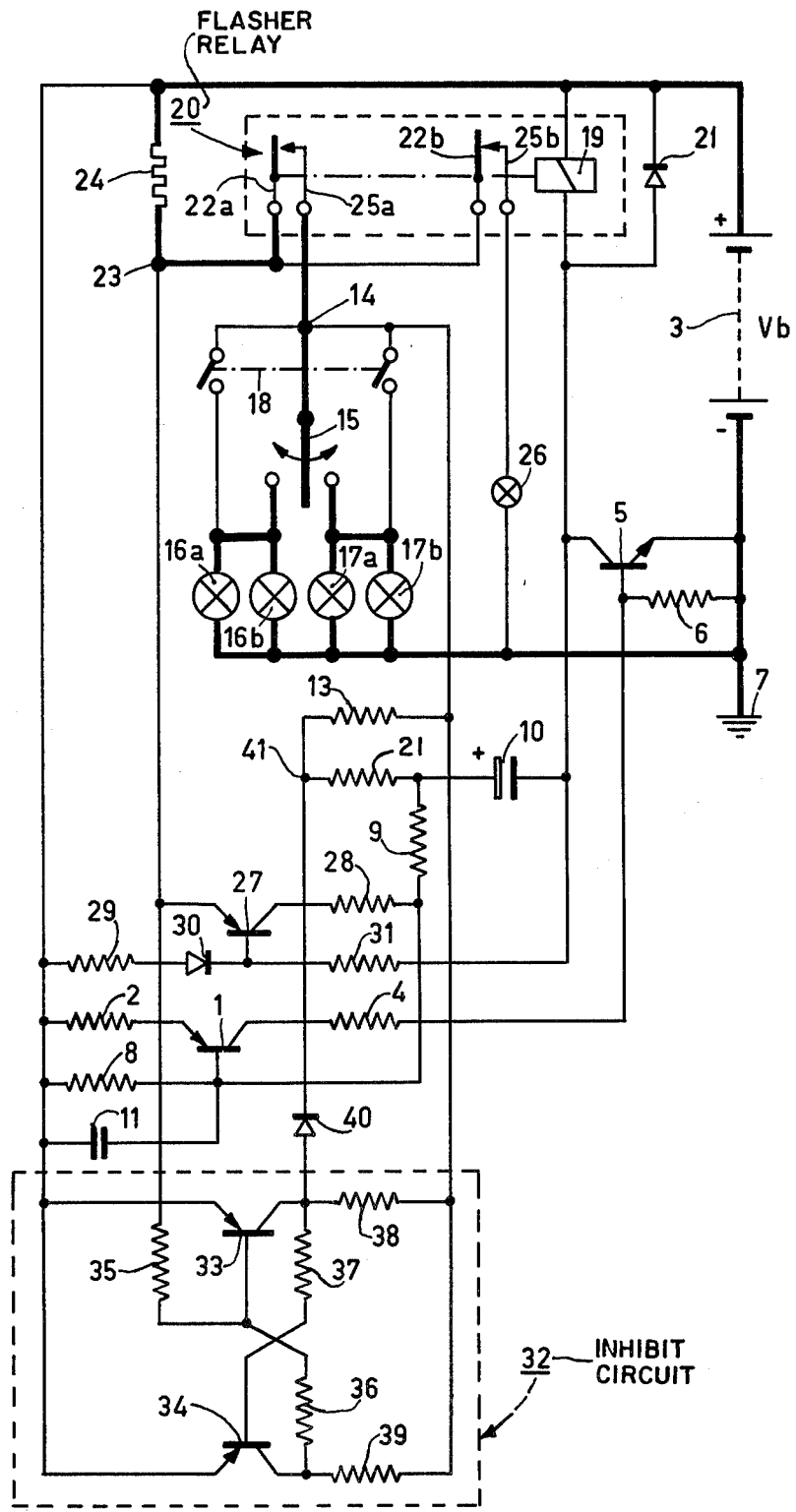

AUTOMOTIVE ELECTRONIC FLASHER UNIT

The present invention relates to an automotive electronic flasher unit of the type which comprises an astable multivibrator circuit which co-operates with an electromagnetic relay having at least one set of contacts for intermittently feeding a current supplied by the vehicle battery through the right-hand and left-hand indicator lamps of the vehicle upon actuation of the turn signal switch. In spite of their much higher price there is a growing trend to replace the conventional hot-wire flashers by electronic flashers, at least in the top-of-the-line cars, because of their very high reliability.

The major auto makers have drawn up specifications which define certain requirements with which electronic flasher units should comply. One of these requirements is a test for correct performance in the case of an excess current. For example, in the case of a 12 V accumulator battery is, the test, made with the aid of a resistor of approximately 0.5 ohms which allows a current of 25 A to pass for a period of 20 seconds.

In this case a fuse provides no protection since a quick fuse cannot be used because of the high current drain as a result of the low resistance of the cold lamp filaments. Furthermore, in most cases a slow fuse is ineffective because it cannot prevent the flasher unit from being damaged beyond repair.

The certificate of addition no. 2,185,097 to French Pat. No. 2,168,660 describes a flasher unit in which the lamps L1 to L4 are directly energized by two parallel transistors T3. In the event of a short-circuit of one of the lamps the base current automatically ensures that the current drain is limited to a value which is not dangerous for the power transistors.

The foregoing means of protection cannot be used in the case of a flasher unit which is equipped with a relay because in that case the excess current caused by the short circuit is detrimental to the contacts of said relay and not to the driver transistor thereof.

A further requirement is that in the event of an interruption in the filament or the supply circuit of the lamps, the flasher frequency changes substantially so that the driver of the vehicle is immediately warned.

Moreover, it is desirable that in addition to the visual check provided by a pilot lamp an audible signal be produced. Generally, this results in the use of an electromagnetic relay which has the further advantage that the use of transistors with a high current rating can be avoided, said transistor being expensive and bulky because of the heat sinks which are necessary.

It is one of the objects of the present invention to provide an electronic flasher unit whose operation is automatically interrupted in the case of a total or partial short-circuit in the lamp circuit, and is restored once the short-circuit is over.

It is a further object of the invention to obtain a substantial change of the flashing frequency of the unit in a very simple manner when the filament of one of the lamps has burnt out or when the supply circuit is interrupted.

In accordance with the invention I provide an automotive electronic flasher unit of the type which comprises an astable multivibrator or other suitable oscillator circuit which co-operates with an electromagnetic relay having at least one set of contacts for intermittently feeding a current supplied by the vehicle battery through the right-hand and left-hand indicator lamps of the vehicle upon actuation of the turn signal switch. The invention is characterized in that a resistor of low value is included in the lamp circuit between a terminal of the battery and a relay contact. The end of the resistor which is connected to said contact is also connected both to the base of one of the transistors of a bistable multivibrator which constitutes a circuit which inhibits the operation of the astable multivibrator, and to the emitter of a frequency changer transistor which constitutes an element for changing the repetition frequency of the astable multivibrator. The output terminal of the bistable multivibrator and the collector of the frequency changer transistor are coupled to the network which defines the time constant of the astable multivibrator.

The voltage drop across the resistor of a few hundredths of ohms which has been included in the lamp circuit, when it exceeds a certain value which corresponds to the occurrence of a partial or complete short-circuit, is employed for actuating the inhibiting circuit so as to disable the multivibrator in the position "relay open". When said voltage drop is below a value which corresponds to the presence of a burnt-out lamp or a circuit interruption, it is used for changing the frequency of said multivibrator.

Connection to the circuitry of the vehicle in which the flasher unit in accordance with the invention is to be used is as simple as connection of the conventional "hot-wire" type. In addition, its flashing frequency is substantially independent of the battery voltage in the range from a fully charged battery (including one which is still being charged by the generator) to a discharged battery, and without the use of any stabilizing circuit.

Furthermore, the power consumption of the electronic flasher unit in accordance with the invention is zero when not in use, and without employing an auxiliary circuit breaker which is usually coupled to the commonly used left-right switch by means of which a hot-wire flasher is actuated.

The invention will be described in more detail with reference to the sole drawing which shows the circuit diagram of the flasher unit in accordance with the invention.

In the FIGURE the emitter of a PNP-type transistor 1 is connected to the positive terminal of a battery 3 via a resistor 2, which battery constitutes an energy source supplying a voltage Vb. The collector of said transistor is coupled to the base of an NPN-type transistor 5 via a resistor 4. A resistor 6 is included between the base of the transistor 5 and a common ground 7 to which the emitter of the transistor 5 and the negative terminal of the battery 3 are connected.

The base of the transistor 1 is biassed by a voltage divider which comprises a resistor 8 connected between said base and the positive terminal of the battery 3, and a resistor 9 which is included between said base and the positive terminal of an electrolytic capacitor 10 whose negative terminal is connected to the collector of the transistor 5. The resistor 8 is shunted by a capacitor 11 which filters out currents of high frequency.

Between the positive terminal of the capacitor 10 and a point 14 two series-connected resistors 12 and 13 are included, said point 14 being the centre contact of a left-right turn signal switch 15 which controls the lamps 16a, 16b and 17a, 17b of the indicator lights. The lamps are included in pairs between the fixed contacts of the switch 15 and the negative terminal of the battery 3. Between the centre contact and the fixed contacts of the switch 15 a double "hazard" circuit breaker 18 is included which enables the four lamps 16a, 16b, 17a and 17b to flash simultaneously.

The coil 19 of the flasher relay 20 is included between the positive terminal of the battery 3 and the collector of the transistor 5, said coil being shunted by an overvoltage protection diode 21 (anode connected to the collector).

The movable contacts 22a and 22b of the flasher relay 20 are connected to a point 23 which is connected to the positive terminal of the battery 3 via a resistor 24 of low resistance value. The the fixed contact 25a of said relay is connected to point 14 and the fixed contact 25b to the common ground 7 via a pilot lamp 26.

The emitter of the PNP-type transistor 27 is connected to point 23, while the collector is connected to the base of the transistor 1 via a resistor 28. The base of the transistor 27 is biassed from the positive terminal of the battery 3 via a voltage divider whose one branch is constituted by a resistor 29 in series with a silicon temperature compensation diode 30 (cathode to base) and whose other branch is constituted by a resistor 31 which is connected to the collector of the transistor 5.

The inhibit circuit 32 comprises two PNP-type transistors 33 and 34 whose emitters are directly connected to the positive terminal of the battery 3. The base of the transistor 33 is connected to point 23 via a resistor 35. The crosswise basecollector couplings of the two transistors is established by two resistors 36 and 37, while the collectors are connected to point 14 via two resistors 38 and 39 respectively. A diode 40, whose anode is connected to the collector of the transistor 33, is included between said collector and a point 41 which is common to the resistors 12 and 13.

The flasher unit in accordance with the invention operates as follows: the astable multivibrator circuit which causes the flashing comprises the PNP transistor 1 and the NPN transistor 5, whereas detection of a burnt-out lamp is effected by the PNP transistor 27. The inhibit circuit which cuts off the power supply to the lamps in the case of an excess current or a short-circuit is constituted by the PNP transistors 33 and 34.

In the FIGURE the parts of the circuit through which a large current flows in the normal left-hand or right-hand flashing position are represented by heavy lines.

As the emitter of the transistor 5 and the resistor 6 are the only components which are connected to the ground point 7 when the switch 15 is in the rest position, all the transistors of the flasher unit are cut off and the current consumption is substantially zero. The capacitor 10 is discharged so that its two plates have a potential of +Vb relative to ground.

When the switch 15 is set to the left-hand or right-hand position, point 14 is momentarily connected to ground potential via the filament of the relevant lamps and a current flows from +Vb to −Vb via the resistors 8, 9, 12 and 13. As a result of this the base of transistor 1 becomes negative so that this transistor becomes conductive, which causes the transistor 5 to be turned on immediately.

The voltage at the negative pole of the capacitor 10 decreases, which causes the base current of the transistor 1 to increase and the two transistors to bottom in a very short time owing to the cumulative effect. The relay 20 is then energized and causes the lamps to light via the contacts 22a and 25a so that point 14 is brought to a potential of approximately +Vb.

The capacitor 10 is then charged at once via the emitter-base path of the transistor 1 and the resistor 9, and via the resistors 13 and 12.

When the value of the portion of the charging current of the capacitor 10 which flows in the base of the transistor 1 becomes too small, this transistor is cut off so that the transistor 5 is also cut off. At this instant the potential of the negative pole of the capacitor 10 changes suddenly to a value which is substantially equal to +Vb, while the potential of the positive pole changes to 2x Vb (assuming that the full charge is present at the instant of cut-off). As the transistor 5 is cut off, the relay 20 is deenergized and the lamps extinguish, thus marking the end of the on-period.

The portion of the positive charge of the capacitor 10 which is determined by the ratio of the values of the resistors 8 and 9 is applied to the base of the transistor 1 which then remains cut off. The capacitor 10 is then discharged to the voltage +Vb via resistors 9 and 8 and to ground via the resistors 12, 13 and the filaments of the two lamps which are included in the circuit. When the capacitor 10 is completely discharged, it adopts a small inverse charge which causes the transistor 1 to conduct, thus marking the end of the off-period.

When the switch 15 is in the neutral position, the potential of the point 14, which is now isolated from the negative terminal, becomes +Vb, which by cutting off the transistor 1 prevents the flasher unit from being actuated.

The time constant during the on-period is substantially shorter than that during the off-period because the resistor 8 is then partially short-circuited via the base-emitter path of the transistor 1 and via the resistor 2 whose resistance value is substantially lower than that of the resistor 8. The flashing rhythm is adjusted to approximately 100 cycles per minute.

Upon each closure of the contacts 22a and 25a of the relay 20 the current through the lamps included in the circuit produces a voltage drop of approximately 200 mV across the resistor 24 after the filament warm-up period, which voltage drop biasses the emitter of the transistor 27 so that it remains cut off.

If one of the lamps is burnt out, the current consumption is approximately halved and because the emitter of the frequency changer transistor 27 is no longer biassed to approximately 110 mV, this transistor becomes conductive causing the charging current of the capacitor 10 to increase and thus the time constant of the on-period to decrease. The flashing frequency then increases in a very visible and audible manner to approximately 150 cycles per minute.

At the instant that the switch 15 is actuated, as stated previously, point 14 is momentarily connected to ground potential via the lamp filaments so that the bistable multivibrator 32 is energized. In the initial state the transistor 34 is conductive and the transistor 33 is cut off. At the instant at which the contacts 22a and 25a are closed, the excess current owing to the low resistance of the lamps in the cold condition produces a voltage across the resistor 24 which suffices to keep the multivibrator 32 energized and, moreover, to cause said multivibrator to change over to its other state, bottoming the transistor 33 via the transistor 35.

When the situation is normal, the current decreases rapidly and stabilizes at a maximum value of approximately 8 A in the "hazard" mode (switch 18 closed). At this instant the voltage drop across the resistor 24 is too small to energize the multivibrator 32 and the transistors 33 and 34 cut off. The short period of conduction of the transistor 33 has no effect on the operation of the astable multivibrator because this occurs after the transistors 1 and 5 have reached the bottomed state.

At the end of the on-period the contacts 22a and 25a open, the multivibrator 32 is again energized and the transistor 34 becomes conductive for the entire off-period.

In the event of a fault in the system owing to a more or a less serious short-circuit, a comparatively substantial voltage drop of approximately 2.5 V at a current of 50 A will appear across the resistor 24 at the instant that the contacts 22a and 25a open. This voltage drop keeps the multivibrator 32 energized and the transistor 33 conductive for the entire on-period.

The multivibrator 32 remains in the same state during the off period so that point 41 is brought to a potential of approximately +Vb via the diode 40 and the flasher control astable multivibrator is prevented from being re-started. This results in an interruption of the defective circuit owing to the relay 20 not being energized.

In order to enable the multivibrator to be re-started, the switch 15 must be reset to the neutral position and subsequently moved to the flashing position. If the overload condition persists, the electronic cut-out intervenes again after the first change-over of relay 20.

As it is necessary for the operation of the flasher unit that point 14 be alternatively at a potential of +Vb and −Vb, a second set of contacts 22b-25b is employed for controlling the pilot lamp 26 on the dashboard.

The automotive electronic flasher unit in accordance with the invention has been realized using the following components:

Transistor 1: BC 558 B - Transistor 5: BC 338
Transistors 27, 33 and 34: BC 558
Diode 21: BAX13 - Diodes 30 and 40: BAV10
Resistor 2: 47 ohms - Resistor 4: 470 ohms
Resistor 6: 1 kohm - Resistors 8 and 9: 10 kohms
Resistor 12: 27 kohms - Resistor 13: 2.7 kohms
Resistor 24: 50 mohms - Resistor 28: 1.5 kohm
Resistor 29: 82 ohms - Resistors 31 and 35: 10 kohms
Resistor 36: 33 kohms - Resistors 37: 10 kohms
Resistor 38: 33 kohms - Resistor 39: 15 kohms
Coil 19 of relay 20: 12 V – 40 ohms
Lamps 16a, 16b, 17a and 17b: 12 V – 21W
Lamp 26: 12 V – 4 W

What is claimed is:

1. An automatic electronic flasher unit for vehicle direction indicator lamps comprising, a terminal for supplying DC operating voltage to the flasher unit, a switch connected in circuit to selectively operate the indicator lamps, an electromagnetic relay having at least one set of contacts connected in circuit with said switch and said indicator lamps to the DC supply terminal so as to intermittently supply a current to selected ones of the indicator lamps upon operation of said switch, an astable multivibrator including at least one transistor for controlling the flashing frequency of the indicator lamps, first means connecting the astable multivibrator to the relay to control the relay operation, a resistor having a low resistance value connected between the supply terminal and one contact of the relay, a bistable multivibrator including first and second cross-coupled transistors connected as an inhibit circuit so as to inhibit operation of the astable multivibrator, a frequency changer transistor having an input electrode and an output electrode, second means connecting the end of said resistor which is connected to the one relay contact to the base of the first transistor of the bistable multivibrator and to the input electrode of said frequency changer transistor, a timing network including a capacitor and coupled to the one transistor of the astable multivibrator to control its operating frequency, and means for coupling an output terminal of the bistable multivibrator and the output electrode of the frequency changer transistor to said timing network.

2. An electronic flasher unit as claimed in claim 1 wherein said second connecting means includes a first resistor connected between the base of the first transistor of the bistable multivibrator and said end of the resistor of low resistance value.

3. An electronic flasher unit as claimed in claim 1 wherein the output terminal of the bistable multivibrator is connected to the timing network via a semiconductor diode.

4. An electronic flasher unit as claimed in claim 1 wherein the output electrode of the frequency changer transistor is its collector and said collector is connected to the timing network via a resistor.

5. An electronic flasher unit as claimed in claim 1 further comprising two supply lines for the bistable multivibrator, one line being connected to said DC supply terminal and the other to a comman contact of said switch.

6. An automatic flasher unit for a bank of lamps comprising, a DC voltage supply terminal, a switch, a relay having a coil and at least one pair of contacts, a resistor having a low resistance value, means serially connecting the bank of lamps, the switch, the pair of relay contacts and the resistor to the DC supply terminal, an oscillator circuit including at least one transistor and coupled to said relay coil to control the operation of the relay so as to supply an intermittent current to the lamps via the relay contacts upon operation of the switch, a bistable circuit including first and second cross-coupled transistors and an output terminal connected to the oscillator circuit to inhibit its operation in the event a current exceeding a given level is drawn from the DC supply terminal, a timing network including a capacitor and coupled to the oscillator circuit to control its operating frequency, a third transistor having an input circuit coupled to said resistor and an output electrode coupled to said timing network to alter the time constant thereof in the event one or more of the lamps burns out, and means coupling the input circuit of said first transistor of the bistable circuit to said resistor.

7. A flasher unit as claimed in claim 7 wherein said oscillator circuit includes a further transistor serially connected with the relay coil to the DC supply terminal and with a control electrode of the further transistor coupled to an output electrode of said one transistor of the oscillator circuit.

8. A flasher unit as claimed in claim 6 wherein the timing network is connected to a control electrode of said one transistor of the oscillator circuit, said third transistor being connected in a charge circuit for the capacitor of the timing network, and means for biasing said third transistor into cut-off during normal operation of the lamps.

9. A flasher unit as claimed in claim 6 wherein said bank of lamps comprises first and second parallel connected pairs of indicator lamps in a motor vehicle and said switch comprises the turn signal switch which is arranged to selectively connect said first and second pairs of lamps to the DC supply terminal via the relay contacts and the low resistance value resistor.

10. A flasher unit as claimed in claim 9 wherein said turn signal switch has an open circuit rest position and first and second actuation positions for respectively connecting said first and second pairs of lamps to the DC supply terminal, the flasher unit further comprising circuit means for coupling said first and second transistors of the bistable circuit and said third transistor to the switch so that in the rest position of the switch the DC voltage supply circuit for said first, second and third transistors is open circuited to maintain said transistors non-conductive.

11. A flasher unit as claimed in claim 6 wherein said output terminal of the bistable circuit is coupled to a control electrode of said one transistor of the oscillator circuit and to the timing network via a diode whereby the bistable circuit can hold said one transistor in cut-off when said given current level is exceeded thereby to inhibit operation of the oscillator circuit.

* * * * *